United States Patent [19]

Beffa et al.

[11] 4,331,596
[45] May 25, 1982

[54] ARYLAZOARYLAZO-SUBSTITUTED AZO, AZOMETHINE 1:2 CHROMIUM COMPLEX DYES

[75] Inventors: Fabio Beffa, Riehen, Switzerland; Gerhard Back, Lörrach, Fed. Rep. of Germany

[73] Assignee: Ciba-Geigy Corporation, Ardsley, N.Y.

[21] Appl. No.: 102,498

[22] Filed: Dec. 11, 1979

Related U.S. Application Data

[63] Continuation of Ser. No. 945,142, Sep. 22, 1978, abandoned, which is a continuation of Ser. No. 823,806, Aug. 11, 1977, abandoned, which is a continuation of Ser. No. 572,689, Apr. 29, 1975, abandoned.

[30] Foreign Application Priority Data

May 9, 1974 [CH] Switzerland .................. 6369/74

[51] Int. Cl.³ ............... C09B 45/06; C09B 45/16; C09B 45/26; D06P 3/32
[52] U.S. Cl. .................. 260/145 A; 260/145 B; 260/147; 260/149; 260/150; 260/151; 260/158; 260/186; 260/191
[58] Field of Search ............... 260/145 A, 145 B

[56] References Cited

U.S. PATENT DOCUMENTS

| | | | |
|---|---|---|---|
| 2,855,393 | 10/1958 | Schetty et al. | 260/145 B |
| 2,985,646 | 5/1961 | Schetty et al. | 260/145 A |
| 3,086,967 | 4/1963 | Davies et al. | 260/145 A |
| 3,185,676 | 5/1965 | Klein | 260/145 A |
| 3,252,963 | 5/1966 | Blackhall et al. | 260/147 |
| 3,391,132 | 7/1968 | Beffa et al. | 260/145 A |
| 3,398,132 | 8/1968 | Dehnert | 260/145 A |
| 3,516,980 | 6/1970 | Dore et al. | 260/146 A |

FOREIGN PATENT DOCUMENTS

| | | | |
|---|---|---|---|
| 2210260 | 9/1963 | Fed. Rep. of Germany | 260/145 A |
| 1442837 | 5/1966 | France | 260/145 A |

OTHER PUBLICATIONS

Venkataraman, "The Chemistry of Synthetic Dyes", vol. III, pp. 309 and 310 (1970).

Primary Examiner—Floyd D. Higel
Attorney, Agent, or Firm—Edward McC. Roberts

[57] ABSTRACT

1:2 Chromium complex dyes of the formula

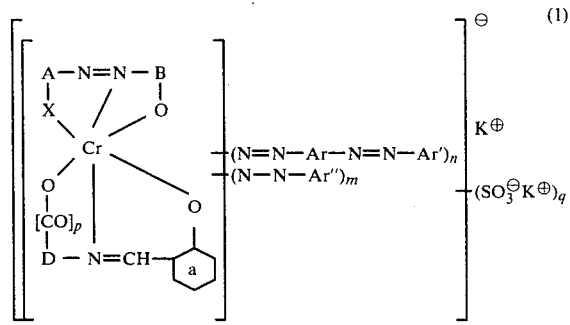

wherein A is the radical of a diazo component of the benzene or naphthalene class which carries the complex forming group X in ortho-position to the azo group, B is the radical of a coupling component which couples in ortho-position to the oxy group, D is the radical of an amine of the benzene or naphthalene class which carries the complex-forming group in ortho-position to the azo group, X is an oxygen atom or a —CO—O— group, Ar is an aromatic carbocyclic radical. Ar' and A" are aromatic carbocyclic or heterocyclic radicals, q is an integer from 0 to 5, n is an integer from 1 to 3, m is an integer from 0 to 2 and p is 0 or 1, but the sum of n+m may be at most 3, and wherein the benzene ring can carry a further fused benzene ring or can be substituted by halogen, nitro, alkyl or alkoxy, and K⁺ is a cation. The water-insoluble dyes are useful in dyeing polyamide textile material and for coloring leather, oil vanishes, and paper as well as viscose, polyamide, cellulose ether and cellulose ester spinning compositions, and the water-soluble dyes are useful in dyeing leather, wool, silk, casein, polyamide and polyurethane fibers and furs; and the dyes possess good covering power and fastness properties.

10 Claims, No Drawings

ARYLAZOARYLAZO-SUBSTITUTED AZO, AZOMETHINE 1:2 CHROMIUM COMPLEX DYES

This is a continuation of application Ser. No. 945,142 filed on Sept. 22, 1978, now abandoned which is a continuation of application Ser. No. 823,806 filed Aug. 11, 1977, now abandoned, which is a continuation of application Ser. No. 572,689 filed Apr. 29, 1975, now abandoned.

The present invention provides 1:2 chromium complex dyes of the formula

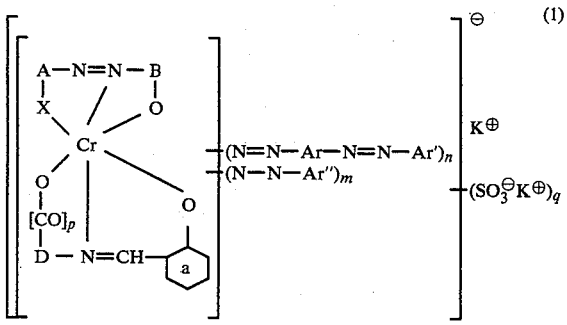

where A is the radical of a diazo component of the benzene or naphthalene class which carries the complex-forming group X in ortho-position to the azo group, B is the radical of a coupling component which couples in ortho-position to the oxy group, D is the radical of an amine of the benzene or naphthalene class which carries the complex-forming group in ortho-position to the azo group, X is an oxygen atom or a —CO—O— group, Ar is an aromatic carbocyclic radical, Ar' and Ar'' are aromatic carbocyclic or heterocyclic radicals, q is an integer from 0 to 5, n is an integer from 1 to 3, m is an integer from 0 to 2 and p is 0 or 1, but the sum of n+m may be at most 3, and wherein the benzene ring a can carry a further fused benzene ring or can be substituted by halogen, nitro, alkyl and alkoxy, especially by low molecular alkyl and alkoxy, and K+ is a cation.

The term "low molecular" denotes herein groups with 1 to 4 carbon atoms; the terms "aryl" denotes in particular phenyl and phenyl which is substituted by halogen, nitro, low molecular alkyl or alkoxy; and by "aralkyl" is meant above all the benzyl group.

The dyes of the formula (1) are obtained by converting a dye of the formula $$A-N=N-B \quad (2)$$
$$\;\;|\qquad\quad\;\;|$$
$$XH\qquad OH$$

or

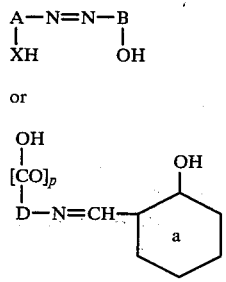

wherein the symbols A, B, X, D, p and a have the same meanings as in formula (1) and both dye molecules together carry 0 to 5 sulpho groups and contain 1 to 3 disazo groups of the formula $$-N=N-Ar-N=N-Ar' \quad (4)$$

or 1 disazo group of the formula (4) and one or 2 monoazo groups of the formula $$-N=N-Ar'' \quad (5)$$

or 2 disazo groups of the formula (4) and 1 monoazo group of the formula (5), with the chromium donor into the 1:1 chromium complex and subsequently reacting this latter with the nonmetallised dye of the formula (3) or (2) to give the 1:2 chromium complex.

It is preferred to form the 1:1 complex of the azo dye of the formula (2) and to add the azomethine dye thereto. Since azomethine dyes are readily formed, it is also possible to use the corresponding educts instead of the dye of the formula (3), i.e. amines of the formula

and aldehydes of the formula

wherein any groups which may be bonded to the ring a and the radical D are already present in these starting materials.

Instead of the groups which are capable of complex formation, the dyes of the formula (2) can carry substituents which can be converted into metallisable groups, for example low molecular alkoxy groups, especially methoxy groups, provided metallisable group, e.g. a hydroxy group, is formed therefrom during the chroming. Preferred complex-forming groups are hydroxy groups.

It is preferable to use azomethine compounds which contain only one radical of the formula (4) which is above all in 3- or 5-position of the ring a, i.e. in ortho- or para-position to the hydroxy group, the para-position being preferred.

Ar, Ar' and Ar'' in the formulae (4) and (5) are benzene residues or naphthalene radicals, Ar' and Ar'' are also heterocyclic radicals, e.g. thiazolyl, benzthiazolyl, thiadiazolyl, benzisothiazolyl, imidazolyl, benzimidazolyl, pyrazolyl, triazolyl, naphthothiazolyl, quinolinyl, pyridinyl, indazolyl oxazolyl or benzoxazolyl radicals. The radicals Ar' and Ar'' can carry all the customary substituents for diazo components, but preferably they are phenyl or naphthyl radicals which are unsubstituted or substituted by chlorine, bromine, nitro, sulpho, sulphonamido and N-monosubstituted or N,N-disubstituted sulphonamide groups, sulphone groups, low molecular alkyl or alkoxy groups. Ar is preferably a phenylene or naphthylene radical and the possible substituents are primarily low molecular alkyl and alkoxy radicals, e.g. methyl, ethyl and methoxy.

The dyes of the formula (2) can be manufactured in known manner by coupling. The radical A can be a radical of the benzene or naphthalene class and in addition to the complex forming groups can carry the customary substituents, e.g. chlorine, bromine, cyano, nitro, low molecular alkyl, low molecular alkoxy, aryloxy, above all phenoxy, sulpho, sulphonamido and N-monosubstituted or N,N-disubstituted sulphonamido groups, sulphone groups, especially low molecular alkylsulphonyl groups and acylamino groups.

The term "acylamino" denotes herein amino groups which are substituted by acyl radicals of aliphatic or aromatic sulphonic and, in particular, carboxylic acids or of carbonic acid monoalkyl or monoaryl esters. The term "acyl" thus encompasses low molecular alkanoyl, alkoxycarbonyl and alkylsulphonyl groups, such as the acetyl, chloroacetyl, propionyl, butyryl, methoxycarbonyl, ethoxycarbonyl, methylsulphonyl or ethylsulphonyl groups, as well as aroyl, aryloxycarbonyl and arylsulphonyl groups, e.g. the benzoyl, chlorobenzoyl, methylbenzoyl, nitrobenzoyl, phenoxycarbonyl, phenylsulphonyl or p-methylphenylsulphonyl group. Preferred acylamino groups are low molecular alkanoylamino, alkoxycarbonylamino or unsubstituted or substituted benzoylamino groups.

As monosubstituted or disubstituted sulphonamide groups mention may be made principally of the sulphonamide groups which are substituted by low molecular alkyl, hydroxyalkyl, alkoxyalkyl, cyanoalkyl, aralkyl, cacloalkyl, in particular cyclohexyl, aralkyl, in particular benzyl, sulphonamide groups which are substituted or by aryl radicals. Suitable sulphone groups are primarily low molecular alkylsulphonyl groups, low molecular alkylsulphonyl groups which are substituted by hydroxy, chlorine or low molecular alkoxy, chlorophenylsulphonyl, methylphenylsulphonyl, nitrophenylsulphonyl, methoxyphenylsulphonyl or benzylsulphonyl groups.

Examples of suitable diazo components of dyes of the formula (2) are: anthranilic acid, 4-sulpho- and 4-sulphonamidoanthranilic acid, 2-amino-1-hydroxybenzene, 2-amino-1-methoxybenzene, 4-chloro- and 4,6-dichloro-2-amino-1-hydroxybenzene, 4- or 5-nitro-2-amino-1-hydroxybenzene, 4-chloro- and 4-methyl- and 4-acetylamino-6-nitro-2-amino-1-hydroxybenzene, 6-acetylamino- and 6-chloro-4-nitro-2-amino-1-hydroxybenzene, 4-cyano-2-amino-1-hydroxybenzene, 4-methoxy-2-amino-1-hydroxybenzene, 2-amino-1-hydroxybenzene-5-methyl- and 5-benzylsulphone, 2-amino-1-hydroxybenzene-4-methyl- , -ethyl-, -chloromethyl- and -butylsulphone, 5-nitro- and 6-nitro-2-amino-1-hydroxybenzene-4-methylsulphone, 2-amino-1-hydroxybenzene-4- or -5-sulphamide, 2-amino-1-hydroxybenzene-4- or -5-sulph-N-methyl- and -sulph-N-$\beta$-hydroxyethylamide, 2-amino-1-methoxybenzene-4-sulphanilide, 4-methoxy-5-chloro-2-amino-1-hydroxybenzene, 4-methyl-2-amino-1-hydroxybenzene, 4-chloro-5-nitro-2-amino-1-hydroxybenzene, 3,4,6-trichloro-2-amino-1-hydroxybenzene, 6-acetylamino-4-chloro-2-amino-1-hydroxybenzene, 4,6-dinitro-2-amino-1-hydroxybenzene, 4-nitro-2-amino-1-hydroxybenzene-5- or -6-sulphonic acid amide, 4- or 5-chloroanisidine, 4- or 5-nitroanisidine, 2-methoxy-5-methylaniline, 2,5-dimethoxyaniline, 2-amino-1-hydroxybenzene-4-sulphanthranilide, 2-amino-1-hydroxybenzene-4- or -5-sulphonic acid, 4-nitro-2-amino-1-hydroxybenzene-5- or -6-sulphonic acid, 5-nitro- or 6-nitro-2-amino-1-hydroxybenzene-4-sulphonic acid, 6-chloro-2-amino-1-hydroxybenzene-4-sulphonic acid, anisidine-4- or -5-sulphonic acid, 1-amino-2-hydroxynaphthalene-4-sulphonic acid, 1-amino-2-hydroxynaphthalene-6-nitro-4-sulphonic acid, 4-(2'-, 3'- or 4'-sulphophenylazo)-2-amino-1-hydroxybenzene, 4-(3'-sulphanamidophenylazo)-2-amino-1-hydroxybenzene, 4-(4'-phenylazophenylazo)-2-amino-1-hydroxybenzene.

The radical B can be derived in particular from the following groups of coupling components: naphthols which are unsubstituted or substituted by chlorine, acylamino, amino, sulphonamido, N-monosubstituted or N,N-disubstituted sulphonamide groups and sulphone groups, these groups having the same meanings as previously assigned to them: 5-pyrazolones which have in 1-position a phenyl or naphthyl radical which is unsubstituted or substituted by chlorine, nitro, low molecular alkyl and alkoxy groups, sulphonamido, N-alkylated sulphonamido groups, sulphone or especially sulpho groups; acetoacetic anilides and benzoylacetic anilides which may be substituted in the anilide nucleus by chlorine, bromine, low molecular alkyl, alkoxy, sulphone, sulphonamide, N-monosubstituted or N,N-disubstituted sulphonamide groups and sulpho groups; phenols which are substituted by low molecular acylamino groups and/or by alkyl groups of 1 to 5 carbon atoms and which couple in the ortho-position: 2,6-dihydroxy-3-cyano- or -carbonamido-4-alkylpyridine and 6-hydroxy-2-pyridones which are substituted in 1-position by low molecular, substituted or unsubstituted alkyl, e.g. methyl, isopropyl, $\beta$-hydroxyethyl, $\beta$-aminoethyl or $\gamma$-isopropoxypropyl, and in 3-position carry a cyano or carbonamide group and in 4-position a low molecular alkyl group, especially methyl.

Examples of such coupling components are:
2-naphthol,
1,3- or 1,5-dihydroxynaphthalene,
2-naphthol-6-sulphonamide,
2-naphthol-6-$\beta$-hydroxyethylsulphone,
1-naphthol,
1-acetalamino-7-naphthol,
1-propionylamino-7-naphthol,
1-carbomethoxyamino-7-naphthol,
1-carboethoxyamino-7-naphthol,
1-carbopropoxyamino-7-naphthol,
1-dimethylaminosulphonyl-amino-7-naphthol,
6-acetyl-2-naphthol,
2-naphthol-3, -4-, -5-, -6-, -7- or 8 sulphonic acid,
1-naphthol-3-, -4- or 5-sulphonic acid,
4acetyl-2-naphthol,
4-methoxy-1-naphthol,
4-acetal-1-naphthol,
1-naphthol-3-, -4- or -5-sulphonamide,
2-naphthol-3-, -4-, -5-, -6-, -7- or -8-sulphonamide,
5,8-dichloro-1-naphthol,
5-chloro-1-naphthol,
1,3-dimethyl-pyrazol-5-one,
1-phenyl-3-methyl-pyrazol-5-one,
1-(2'-, 3'- or 4'-methylphenyl)-3-methyl-pyrazol-5-one,
1-phenylpyrazolone-3-carboxylic acid,
1-phenylpyrazolone-3-carboxylic acid amide,
1-(2'-, 3'- or 4'-sulphophenyl)-3-methyl-pyrazol-5-one,
1-(2'- or 4'-methoxyphenyl)-3-methyl-pyrazol-5-one,
1-(2'-, 3'- or 4'-chlorophenyl)-3-methyl-pyrazol-5-one,
1-(2'-, 3'- or 4'-nitrophenyl)-3-methyl-pyrazol-5-one,
1-(2'-, 5' or 3'-, 4'-dichlorophenyl)-3-methyl-pyrazol-5-one,
1-(2'-, 3'- or 4'-sulphamoylphenyl)-3-methyl-pyrazol-5-one,
1-(2',5'-dichloro-4'-sulphophenyl)-3-methyl-pyrazol-5-one, 1-(2'-, 3'- or 4'-methylsulphonylphenyl)-3-methyl-pyrazol-5-one,
acetoacetic anilide,
acetoacetic anilide-4-sulphonic acid,
acetoacetic-o-anisidide,
acetoacetic-o-toluidide,
acetoacetic-o-chloroanilide,
acetoacetic anilide-3- or -4-sulphonamide,
acetoacetic-m-xylidide,
tetralol,
4-methylphenol,
3-dialkylaminophenol, especially 3-dimethylamino- and 3-diethylaminophenol,
4-butylphenol,
4-amylphenol, especially 4-t-amylphenol,
2-isopropyl-4-methylphenol,
2- or 3-acetylamino-4-methylphenol,
2-methoxycarbonylamino-4-methylphenol,
2-ethoxycarbonylamino-4-methylphenol,
2,4-dimethylphenol and 3,4-dimethylphenol,
2,6-dihydroxy-3-cyano-4-methylpyridine,
1-methyl-3-cyano-4-ethyl-6-hydroxypyridone,
1-phenyl-3-carbonamido-4-methyl-6-hydroxypyridone, The most preferred coupling component for the azo compounds of the formula (2) is β-naphthol.

Also suitable for the manufacture of the azomethine dyes of the formula (3) are amines of the benzene or naphthalene class described in the manufacture of the azo dyes of the formula (2) and which carry besides the complex-forming OH or COOH group the customary substituents, e.g. chlorine, bromine, cyano, nitro, low molecular alkyl, low molecular alkoxy, aryloxy, above all phenoxy, sulpho, sulphonamide and N-monosubstituted or N,N-disubstituted sulphonamide groups, sulphone groups and acylamino groups.

Examples of suitable aldehydes of the formula (7) are:
2-hydroxynaphthaldedehyde, 1-hydroxy-2-napthaldehyde,
2-hydroxybenzoaldehyde,
5-methyl-2-hydroxybenzaldehyde,
3,5-dimethyl-2-hydroxybenzaldehyde,
5-butyl-2-hydroxybenzaldehyde,
5-chloro- or -bromo-2-hydroxybenzaldehyde,
5-sulpho-2-hydroxybenzaldehyde,
3,5-dichloro-2-hydroxybenzaldehyde,
3-chloro-5-methyl-2-hydroxybenzaldehyde,
3-methyl-5-chloro-2-hydroxybenzaldehyde,
as well as above all the corresponding aldehydes which are substituted in 3- or 5-position by an azo or disazo group of the formula (4) and (5). The introduction of an azo or disazo group in to the cited o-hydroxyaldehydes is accomplished in the customary way by coupling a compound Ar'—N=N—Ar—N₂⁺ or Ar''—N₂⁺ with an aldehyde.

These compounds are derived preferably from naphthylamines and especially anilines, for example α-naphthylamine, 4,8-disulpho-β-naphthylamine, 6,8-disulpho-β-naphthylamine, α-naphthylamine-4- or -8-sulphonic acid, m-aminobenzene-sulphamide, aniline, 2-, 3- or 4-sulphoaniline, 4-nitroaniline, toluidine, anisidine, 4-chloroaniline, 4-chloro-3-sulphoaniline, 4-nitro-2-sulphoaniline, 4-methyl-3-sulphoaniline or 2-nitro-4-sulphoaniline.

The preferred group of dyes according to the invention comprises those of the formula

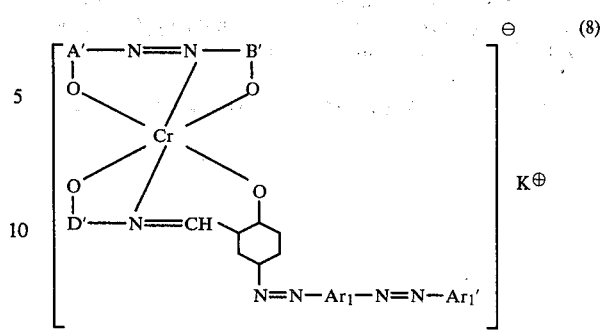

wherein each of A' and D' independently is a phenyl or naphthyl radical which is unsubstituted or substituted by sulpho, sulphonamido, monosubstituted or disubstituted sulphonamido or sulphone groups, especially by the methylsulphone group, chlorine, bromine cyano, nitro, low molecular alkyl and low molecular alkoxy, B' is a phenyl radical which is unsubstituted or substituted in 4-position by low molecular alkyl or acylamino, a naphthyl radical which is unsubstituted or substituted by chlorine, sulpho or sulphonamido, monosubstituted or disubstituted sulphonamido or sulphone groups or by acylamino groups, especially the β-naphthal radical, the radical of a 1-aryl-3-methyl-pyrazol-5-one or the radical of an acetoacetic or a benzoylacetic anilide which is unsubstituted or substituted in the anilide nucleus by sulpho, nitro, sulphonamido, monosubstituted or disubstituted sulphonamido or sulphone groups, chlorine, bromine, low molecular alkyl and low molecular alkoxy, Ar₁ is a phenylene radical which is unsubstituted or substituted by low molecular alkyl or alkoxy or a naphthylene radical which is unsubstituted or substituted by sulpho, and Ar₁' is a phenyl or naphthyl radical which is unsubstituted or substituted by chlorine, bromine, nitro, sulpho, sulphonamido, monosubstituted or disubstituted sulphonamido or sulphone groups, low molecular alkyl or alkoxy groups, and K⁺ is a cation.

Of use are dyes of the formula:

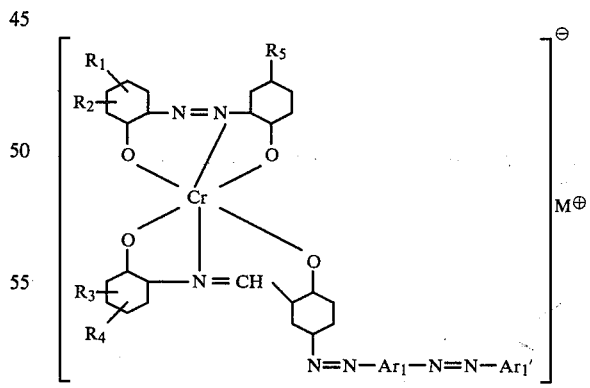

wherein each of the radicals $R_1$, $R_2$, $R_3$ and $R_4$ is hydrogen, sulfo, sulfonamido, or methylsulphonyl, nitro, cyano, chloro, bromo, lower alkyl or lower alkoxy, $R_5$ is hydrogen, lower alkyl or acylamino, Ar₁ is phenylene which is unsubstituted or substituted by lower alkyl or lower alkoxy or is naphthylene which is unsubstituted or substituted by sulfo, $Ar_1'$ is phenyl or naphthyl which are unsubstituted or substituted by chloro, bromo, nitro, sulfo, sulfonamido, lower alkyl or lower alkoxy, and M is a cation.

Dyes according to the invention which are of preeminent interest for the dyeing of leather are those of the formula

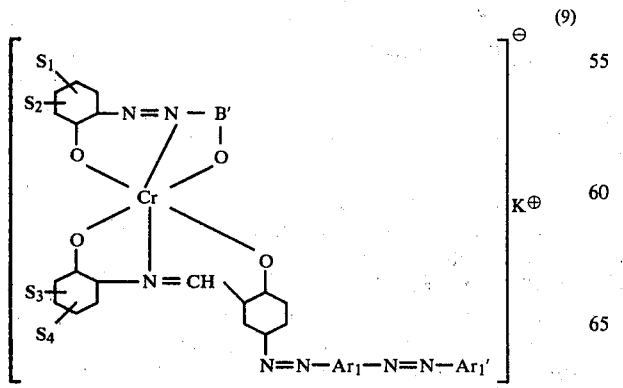

wherein each of the radicals $S_1$, $S_2$, $S_3$ and $S_4$ is hydrogen, sulpho, sulphonamido, monosubstituted or disubstituted sulphonamido or methylsulphone, nitro, cyano, chlorine, bromine, low molecular alkyl or low molecular alkoxy, and those of the formula

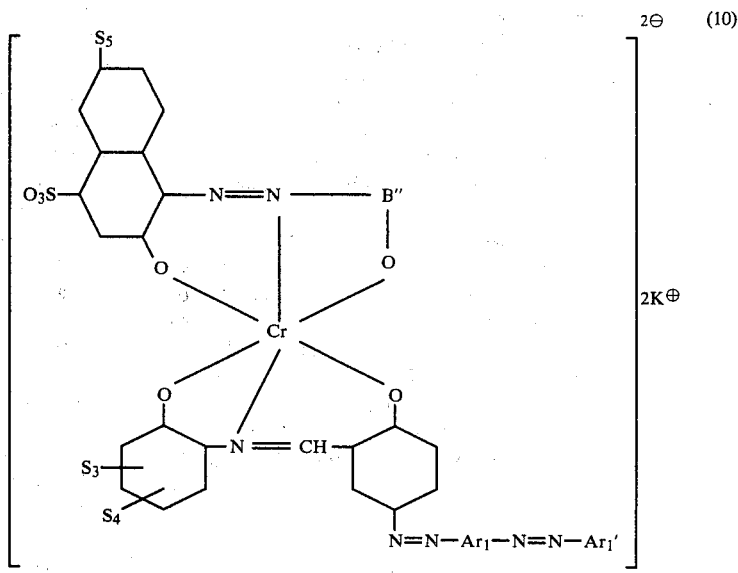

wherein $S_3$ and $S_4$ have the meanings assigned to them hereinbefore, $S_5$ is hydrogen or nitro and B" is the radical of an α-naphthol, a β-naphthol or of a 1-aryl-3-methyl-5-pyrazolone. $Ar_1$ and $Ar_1'$ have herein the meanings assigned to them in formula (8). Dyes with an interesting utility are also those of the formulae (9) and (10) which contain the radical of anthranilic acid instead of the aminophenol radical in the azomethine component. On account of their ready accessibility and tinctorial properties, special mention is also to be made of those dyes which belong to the groups of preferred dyes cited hereinbefore and which have the formula

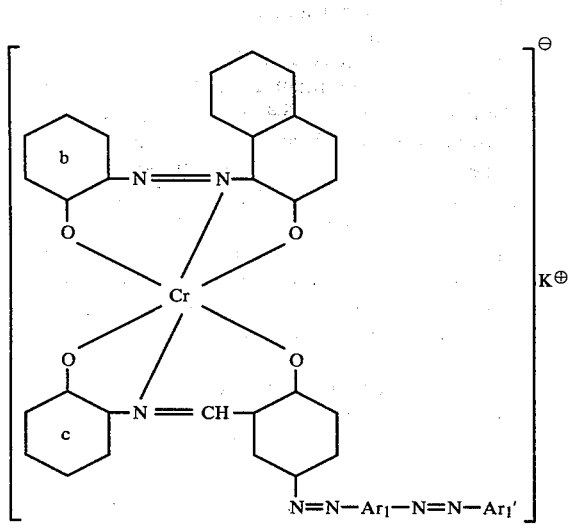

(11)

and

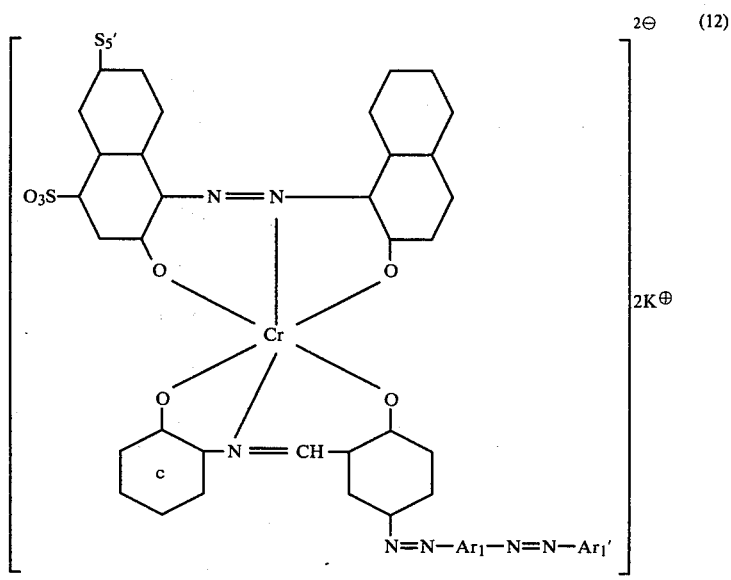

(12)

wherein each of the benzene rings b and c independently is substituted by a nitro, methylsulphonyl or sulpho group or by a nitro and methylsulphonyl or sulpho group, $S_5$ is hydrogen or nitro and $Ar_1$, $Ar_1'$ and $K^+$ have the same meanings as in formula (8).

These preferred dyes will contain one to three sulpho groups per complex molecule.

The conversion of the dyes of the formula (2) or (3) into the 1:1 chromium complex is accomplished by conventional methods which are known per se, e.g. by reacting it in an acid medium with a salt of trivalent chromium e.g. chromium formate, chromium sulphate, chromium chloride hexahydrate or chromium fluoride, at boiling temperature or optionally at temperatures exceeding 100° C. Trivalent chromium can also be manufactured in the reaction mixture from chromium-(VI) compounds by simultaneously adding a reducing agent, e.g. glucose. In general, it is advisable to carry out the metallising in the presence of aqueous, organic-aqueous or in pure organic solvents, e.g. alcohols or ketones.

The reaction of the 1:1 chromium complex of the dye of the formula (2) or (3) with the non-metallised dye of the formula (3) or (2), or the combined single step reaction between a 1:1 chromium complex of a dye of the formula (2), an amine of the formula (6) and an aldehyde of the formula (7) is desirably carried out in a neutral to weakly alkaline medium, in an open or a sealed vessel, and at elevated temperature, e.g. at temperatures between 50° and 120° C. The process can be carried out in organic solvents, e.g. alcohols or ketones or in an aqueous solution, in which case the addition of solvents, e.g. alcohols, dimethyl formamide, can promote the reaction if so desired. It is usually advisable to react as far as possible equivalent amounts of the chromium-containing 1:1 complex and the metal-free dye, the molecular ratio between metal-free dye and 1:1 complex being desirably at least 0.85:1 and at most 1:0.85. A surplus of metal-containing dye is usually less disadvantageous than one of metal-free dye. The closer this ratio is to 1:1 the more advantageous the result generally is.

The novel chromium-containing mixed complexes obtained by the processes described hereinbefore are isolated with advantage in the form of their salts, especially their alkali salts, above all sodium salts, or also ammonium salts or salts of organic amines with a positively charged nitrogen atom. They are suitable for dyeing materials of the most widely differing kind. The water-insoluble dyes are used primarily for dyeing textile material made from polyamide as well as for colouring leather and oil varnishes, paper, viscose, polyamide, cellulose ether and cellulose ester spinning compositions.

They are used in dispersed form for dyeing and printing textile material, when the conventional dispersants can be employed.

The water-soluble dyes are primarily leather and textile dyes and are suitable for dyeing wool and silk, also casein, polyamide and polyurethane fibres and especially for dyeing leather and furs. The novel dyes can also be used for printing these materials. They are readily soluble in water, above all in the form of their alkali salts, e.g. sodium or potassium salts, and are suitable for dyeing from a neutral or a weakly acid bath, e.g. an acetic acid bath. The dyes which contain 1 to 3 sulpho groups are used principally for dyeing textile materials, whereas those with 4 and 5 sulpho groups are suitable for leather. The dyes can contain the customary extenders and be applied with the usual assistants. It is advisable to use a levelling agent, e.g. UNIPEROL or ALBEGAL A, when dyeing textiles with dyes which contain more than 1 sulpho group.

The novel dyes are characterised above all by their good covering power on leather while simultaneously having good fastness properties. They effect level dyeings of good fastness to light, washing, water, perspiration, alkali, acid, diffusion and rubbing. Dyeings of excellent fastness to light and wet treatments are also obtained on materials made from polyamide. Very strong yellowish brown to dark brown shades are obtained.

The following Examples illustrate the invention, the parts and percentages being by weight.

EXAMPLE 1

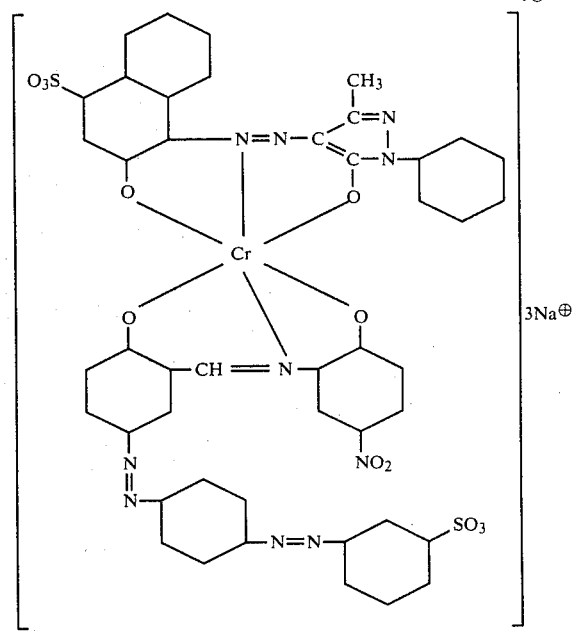

42.4 parts of the monoazo dye obtained from diazotised 1-amino-2-hydroxynaphthalene-4-sulphonic acid and 1-phenyl-3-methyl-5-pyrazolone are stirred with 26.65 parts of chromium chloride hexahydrate in 500 parts by volume of ethylene glycol at 120° to 125° C. until there is no trace of the starting compound. The solution of the resultant 1:1 chromium complex dye is then treated with 15.4 parts of 4-nitro-2-amino-1-hydroxybenzene, 41 parts of the coupling product obtained from diazotised 4-amino-azobenzene-3'-sulphonic acid and salicylaldehyde and 80 parts by volume of sodium carbonate solution (20%) and the reaction mixture is stirred for a further 1 to 2 hours at 80° to 85° C. in order to effect addition. Upon termination of the reaction, the asymmetrical chromium-containing dye is precipitated by addition of saturated sodium chloride solution, filtered off and dried. It takes the form of a brown powder which dissolves in water to give a reddish brown solution and dyes leather from a weakly acid bath in reddish brown shades of generally good fastness properties.

EXAMPLE 2

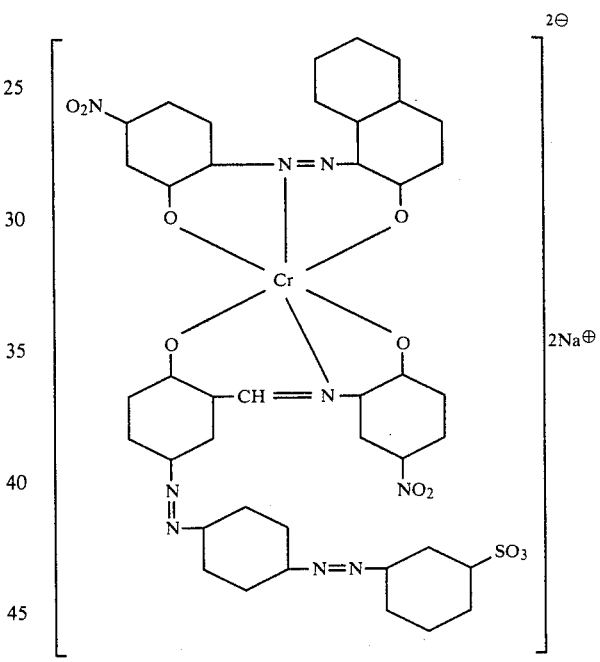

30.9 parts of the monoazo dye obtained from diazotised 5-nitro-2-amino-1-hydroxybenzene and 2-hydroxynaphthalene are suspended in 500 parts by volume of ethylene glycol. Upon addition of 26.65 parts of chromium chloride hexahydrate the mixture is stirred at 120° to 125° C. until the starting compound can no longer be detected. The solution of the resultant 1:1 chromium complex dye is then treated with 15.4 parts of 4-nitro-2-amino-1-hydroxybenzene, 41 parts of the coupling product obtained from diazotised 4-aminoazobenzene-3'-sulphonic acid and salicylaldehyde and 80 parts by volume of 20% sodium carbonate solution and the reaction mixture is stirred for a further 1 to 2 hours at 80° to 85° C. in order to effect addition. Upon termination of the reaction, the asymmetrical chromium-containing dye is precipitated by addition of saturated sodium chloride solution, filtered off and dried.

The product is a dark powder which dissolves in wate to give a brown solution and dyes wool or polyamide materials as well as leather from a weakly acid

EXAMPLE 3

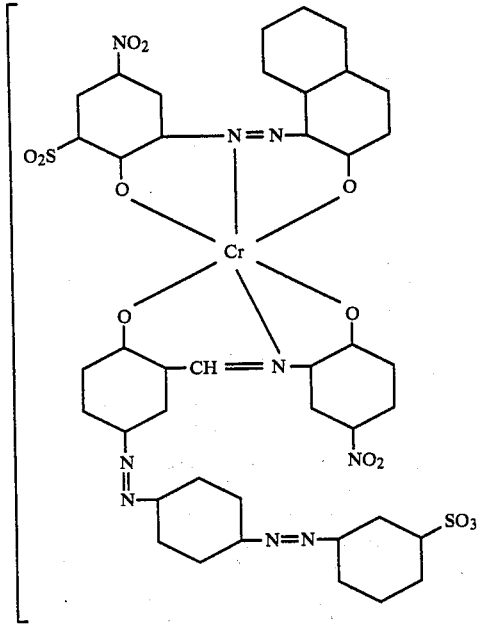

43.9 parts of the 1:1 complex chromium compound which corresponds to 5.2 parts of chromium and 38.9 parts of the monoazo dye obtained from diazotised 4-nitro-2-amino-1-hydroxybenzene-6-sulphonic acid and 2-hydroxynaphthalene, together with 41 parts of the coupling product obtained from 4-aminoazobenzene-3'-sulphonic acid and salicylaldehyde and 15.4 parts of 4-nitro-2-amino-1-hydroxybenzene, are suspended in 1000 parts of water. The mixture is heated to 80° to 85° C. and the pH of the suspension is raised simultaneously to 7 to 7.5 by addition of 20% sodium carbonate solution. The mixture is held at this temperature and at a constant pH by further addition of 20% sodium carbonate solution until the addition reaction is terminated. The novel chromium-containing dye is precipitated by addition of sodium chloride, filtered off and dried. After it has been dried, the product is a dark powder which dyes polyamide material or leather from a weakly acid bath in fast, brown shades of good fastness properties.

EXAMPLE 4

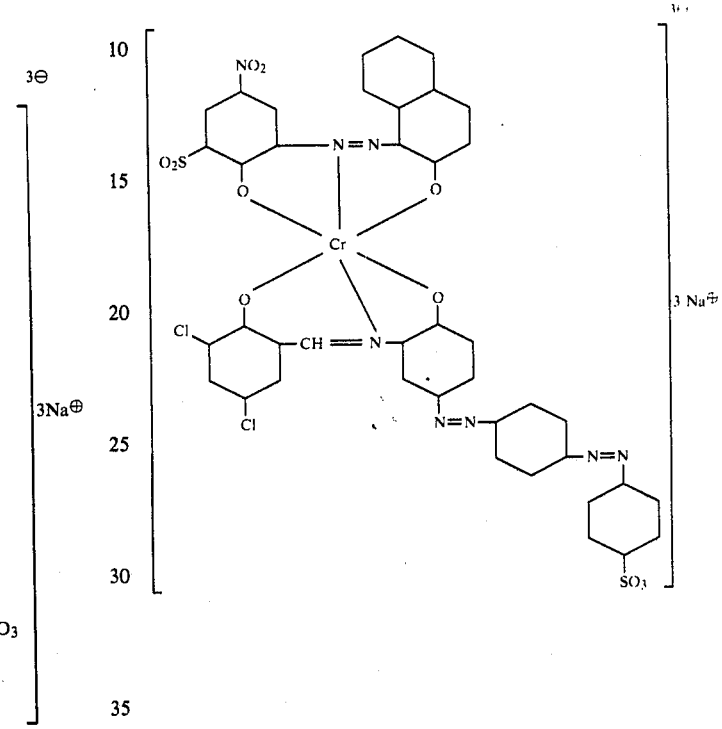

38.9 parts of the monoazo dye obtained from diazotised 4-nitro-2-amino-1-hydroxybenzene-6-sulphonic acid and 2-hydroxynaphthalene are stirred with 26.65 parts of chromium chloride hexahydrate in 500 parts by volume of ethylene glycol at 120° to 125° C. until the starting compound can no longer be detected.

The solution of the resultant 1:1 chromium complex is then treated with 19.2 parts of 3,5-dichloro-6-hydroxybenzaldehyde, 39.7 parts of 3-amino-4-hydroxy-4'(4''-sulphophenylazo)azobenzene (obtained by coupling diazotised 4-aminoazobenzene-4-sulphonic acid with 2-acetylamino-1-hydroxybenzene and saponifying the acetylamino group in alkaline medium) and 80 parts by volume of 20% sodium carbonate solution and the reaction mixture is stirred at 80° to 85° C. to effect addition. Upon completion of the reaction, the final chromium-containing dye is precipitated by addition of saturated sodium chloride solution, filtered off and dried. The product is a dark powder which dissolves in water to give a brown solution and dyes wool or polyamide material as well as leather from a weakly acid bath in brown shades of generally good fastness properties.

EXAMPLE 5

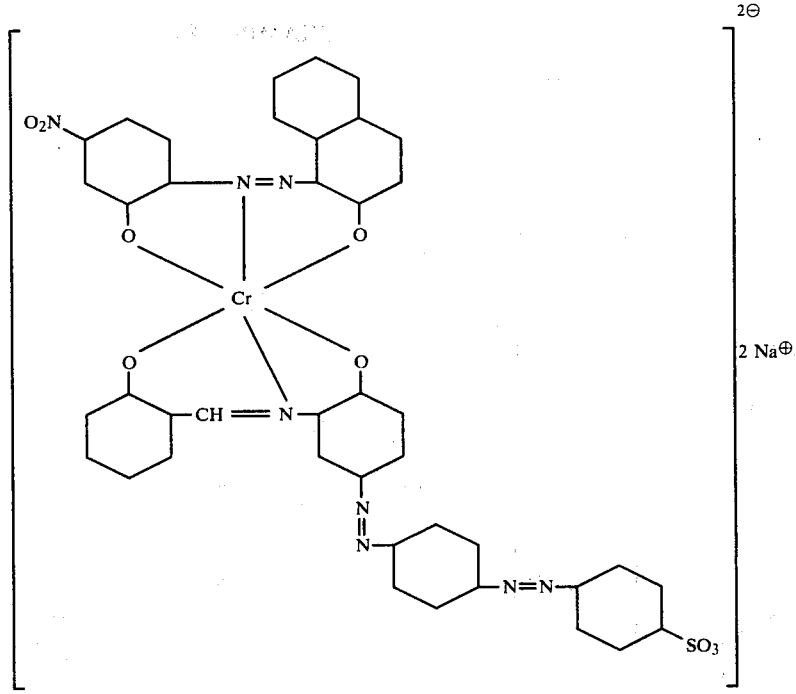

35.9 parts of the 1:1 chromium complex which corresponds to 5.2 parts of chromium and 30.9 parts of the monoazo dye obtained from diazotised 5-nitro-2-amino-1-hydroxybenzene and 2-hydroxynaphthalene, 12.2 parts of salicylaldehyde, 39.7 parts of 3-amino-4-hydroxy-4'(4"-sulphophenylazo)azobenzene as well as 18 parts of sodium carbonate in the form of a 20% solution are suspended in 1000 parts of water. The mixture is heated to 80°–85° C. and held at this temperature until the starting substances can no longer be detected. The novel chromium-containing dye is precipitates by addition of sodium chlorine, filtered off and dried. After it has been dried, the product is a dark powder which dissolves in water to give a brown solution and dyes leather from a weakly acid bath in brownish black shades.

The following Table lists azo and azomethine components which yield 1:2 chromium complexes with similar properties which dye leather in the shades indicated in the last column.

| No. | Dye of the formula (2) | Dye of the formula (3) | Shade |
|---|---|---|---|
| 1 | (structure with OH, OH, N=N, Cl) | (structure with HO₃S, OH, N=CH, OH, NO₂, N=N, N=N) | brown |
| 2 | (structure with OH, OH, N=N, NO₂) | " | brown |
| 3 | (structure with OH, OH, N=N, NO₂) | " | olive brown |
| 4 | (structure with OCH₃, OH, N=N, OCH₃) | " | brown |

-continued

| No. | Dye of the formula (2) | Dye of the formula (3) | Shade |
|---|---|---|---|
| 5 | 2-hydroxy-5-nitrophenyl–N=N–2-hydroxy-5-pentylphenyl | " | yellowish brown |
| 6 | 1-hydroxy-4-sulfo-2-naphthyl–N=N–2-hydroxy-1-naphthyl | " | brown |
| 7 | 1-hydroxy-4-sulfo-6-nitro-2-naphthyl–N=N–2-hydroxy-1-naphthyl | " | brown |
| 8 | 2-hydroxy-3-sulfo-5-nitrophenyl–N=N–2-hydroxy-1-naphthyl | " | brown |
| 9 | 2-hydroxy-4-sulfo-1-naphthyl–N=N–C(OH)=C(–N(cyclohexyl)–N=C–CH₃) pyrazolone | " | brownish red |
| 10 | 2-hydroxy-4-sulfo-6-nitro-1-naphthyl–N=N–C(OH)=C(–N(cyclohexyl)–N=C–CH₃) pyrazolone | 3-sulfo-2-hydroxy-5-nitrophenyl–N=CH–(2-hydroxy-4-(cyclohexyl–N=N–cyclohexyl–N=N–)phenyl) | brownish red |
| 11 | 2-hydroxy-3,5-dinitrophenyl–N=N–2-hydroxy-1-naphthyl | " | brown |
| 12 | 2-hydroxy-5-sulfophenyl–N=N–1-hydroxy-4-sulfo-2-naphthyl | " | brown |
| 13 | 3-sulfo-2-hydroxy-5-nitrophenyl–N=N–2-hydroxy-5-pentylphenyl | " | brown |

-continued

| No. | Dye of the formula (2) | Dye of the formula (3) | Shade |
|---|---|---|---|
| 14 | [structure: naphthol with N=N to dimethoxyphenol] | [structure: complex azo with SO₃H groups] | brown |
| 15 | [structure: naphthol N=N chlorophenol] | " | brown |
| 16 | [structure: naphthol N=N nitrophenol] | " | reddish brown |
| 17 | [structure: naphthol N=N nitrophenol isomer] | " | brown |
| 18 | [structure: HO₃S-naphthol N=N naphthol] | " | brown |
| 19 | [structure: HO₃S-naphthol N=N naphthol with NO₂] | " | brown |
| 20 | [structure: HO₃S, OH, NO₂ phenyl N=N naphthol] | " | brown |
| 21 | [structure: HO₃S, OH, NO₂ phenyl N=N C₅H₁₁-phenol] | " | brown |
| 22 | [structure: HO₂S, OH, NO₂ phenyl N=N-C(CO-NH-cyclohexyl)=C(OH)-CH₃] | " | brownish yellow |

| No. | Dye of the formula (2) | Dye of the formula (3) | Shade |
|---|---|---|---|
| 23 | (2-hydroxy-5-nitrophenyl)azo acetoacetic acid cyclohexylamide | " | brownish yellow |
| 24 | 1-cyclohexyl-3-methyl-4-[(2-hydroxy-5-nitrophenyl)azo]-5-pyrazolone | " | brownish orange |
| 25 | 1-[(2-hydroxy-5-chlorophenyl)azo]-2-naphthol | 2-hydroxy-5-nitrobenzaldehyde coupled azo structure with SO$_3$H | brown |
| 26 | 1-[(2-hydroxy-5-nitrophenyl)azo]-2-naphthol | " | brown |
| 27 | 2,2'-dihydroxy-5-nitro-5'-amyl-azobenzene | " | reddish brown |
| 28 | 1-[(2-methoxy-5-methoxyphenyl)azo]-2-naphthol | " | brown |
| 29 | 1-[(2-hydroxy-6-sulfo-3-nitronaphthyl)azo]-2-naphthol | " | brown |
| 30 | 1-[(2-hydroxy-6-sulfonaphthyl)azo]-2-naphthol | " | brown |
| 31 | 3-sulfo-2-hydroxy-5-nitrophenylazo-2-hydroxy-5-amylbenzene | " | brown |

-continued

| No. | Dye of the formula (2) | Dye of the formula (3) | Shade |
|---|---|---|---|
| 40 | (structure: sulfonated nitro hydroxy phenyl azo hydroxy naphthyl) | " | brown |
| 41 | (structure: hydroxy sulfo naphthyl azo hydroxy naphthyl) | " | brown |
| 42 | (structure: hydroxy sulfo nitro naphthyl azo hydroxy naphthyl) | " | brown |
| 43 | (structure: sulfo hydroxy nitro phenyl azo C(COHCH₃)=C(CO—NH—cyclohexyl)) | " | brownish orange |
| 44 | (structure: sulfo hydroxy nitro phenyl azo hydroxy C₅H₁₁ phenyl) | " | brown |
| 45 | (structure: hydroxy nitro methyl phenyl azo pyrazolone with cyclohexyl and CH₃) | " | brownish red |
| 46 | (structure: sulfo hydroxy sulfo phenyl azo hydroxy naphthyl) | " | brown |
| 47 | (structure: hydroxy sulfo phenyl azo hydroxy sulfo naphthyl) | " | brown |
| 48 | (structure: hydroxy sulfo nitro naphthyl azo hydroxy naphthyl) | (structure: COOH phenyl N=CH hydroxy phenyl N=N phenyl N=N cyclohexyl) | brown |

-continued

| No. | Dye of the formula (2) | Dye of the formula (3) | Shade |
|---|---|---|---|
| 49 | (structure: naphthalene with OH, HO₃S, NO₂, N=N linked to naphthol OH) | " | brown |
| 50 | (structure: naphthalene with OH, HO₃S, N=N–C=C(OH)–N(cyclohexyl) pyrazolone with CH₃) | " | orange red |
| 51 | (structure: HO₃S, OH, NO₂ benzene, N=N, naphthol OH) | " | orange brown |
| 52 | (structure: HO₃S, OH, NO₂ benzene, N=N, naphthol OH with C₅H₁₁) | " | brown |
| 53 | (structure: HO₃S, OH, NO₂ benzene, N=N–C(CO–NH–cyclohexyl)=C(OH)–CH₃) | " | orange |
| 54 | (structure: OH, NO₂ benzene, N=N, naphthol OH) | (structure: OH, SO₃H benzene, N=CH, cyclohexyl-OH, N=N, cyclohexyl, N=N, cyclohexyl) | brown |
| 55 | (structure: OH, Cl benzene, N=N, naphthol OH) | " | brown |
| 56 | (structure: OH, NO₂ benzene, N=N, naphthol OH) | " | brown |
| 57 | (structure: OCH₃, OCH₃ benzene, N=N, naphthol OH) | " | brown |

-continued

| No. | Dye of the formula (2) | Dye of the formula (3) | Shade |
|---|---|---|---|
| 58 | (structure: OH, N=N, OH, NO₂, C₅H₁₁) | " | brown |
| 59 | (structure: OH, N=N, OH, HO₃S) | " | brown |
| 60 | (structure: OH, N=N, OH, HO₃S, NO₂) | " | brown |
| 61 | (structure: OH, N=N, pyrazolone with cyclohexyl, CH₃, HO₃S) | " | brownish red |
| 62 | (structure: HO₃S, OH, N=N, OH, NO₂, C₅H₁₁) | " | brown |
| 63 | (structure: HO₃S, OH, N=N, OH, NO₂) | " | brown |
| 64 | (structure: HO₃S, OH, N=N, OH, NO₂) | (structure: OH, N=CH, OH, NO₂, N=N, N=N, cyclohexyl) | brown |
| 65 | (structure: OH, N=N, OH, HO₃S) | " | brown |
| 66 | (structure: HO₃S, OH, N=N, OH, NO₂) | " | brown |

-continued

| No. | Dye of the formula (2) | Dye of the formula (3) | Shade |
|---|---|---|---|
| 67 | (naphthalene-OH, HO₃S, N=N-C(OH)=C-C(=O)-N(cyclohexyl), C-N, CH₃ pyrazolone) | " | brownish red |
| 68 | (HO₃S, OH-benzene-NO₂)-N=N-(OH-benzene-C₅H₁₁) | " | brown |
| 69 | (HO₃S, OH-benzene-NO₂)-N=N-C(=C(OH)CH₃)(CO-NH-cyclohexyl) | " | brownish orange |
| 70 | (OH-benzene-SO₃H)-N=N-(OH-naphthalene) | " | brown |
| 71 | (OH-benzene-Cl)-N=N-(OH-naphthalene-SO₃H) | " | brown |
| 72 | (HO₃S, OH-benzene-SO₃H)-N=N-(OH-naphthalene) | " | brown |
| 73 | (OH-benzene-NO₂)-N=N-(OH-naphthalene) | (OH-benzene-NO₂)-N=CH-(OH-benzene)-N=N-(benzene)-N=N-(benzene-SO₃H) | brown |
| 74 | (OH-benzene-NO₂)-N=N-(OH-benzene-C₅H₁₁) | " | brown |
| 75 | (OH-benzene-NO₂)-N=N-(OH-naphthalene) | (OH-benzene-NO₂)-N=CH-(OH-benzene)-N=N-(benzene)-N=N-(benzene-SO₃H, SO₃H) | brown |

-continued

| No. | Dye of the formula (2) | Dye of the formula (3) | Shade |
|---|---|---|---|
| 76 | [structure: naphthalene with OH, HO₃S, N=N to naphthol] | " | brown |
| 77 | [structure: naphthalene with OH, HO₃S, NO₂, N=N to naphthol] | " | brown |
| 78 | [structure: naphthalene with HO₃S, OH, NO₂, N=N to naphthol] | " | brown |
| 79 | [structure: phenyl with OH, NO₂, Cl, N=N to naphthol] | [structure: N=CH linkage with cyclohexyl-N=N-cyclohexyl-N=N-SO₃H] | brown |
| 80 | [structure: HO₃S, OH, NO₂, N=N to naphthol] | " | violet brown |
| 81 | [structure: naphthalene with OH, HO₃S, N=N to naphthol] | " | dark brown |
| 82 | [structure: naphthalene with OH, HO₃S, NO₂, N=N to naphthol] | " | dark brown |
| 83 | [structure: naphthalene OH, HO₃S, N=N-C=C(CH₃)-C(OH)=N-N-cyclohexyl pyrazolone] | [structure: N=CH linkage, Cl, N=N-cyclohexyl-N=N-cyclohexyl] | brownish red |
| 84 | [structure: HO₃S, OH, NO₂, N=N to naphthol] | " | brown |

-continued

| No. | Dye of the formula (2) | Dye of the formula (3) | Shade |
|---|---|---|---|
| 85 | | " | brown |
| 86 | | | brown |
| 87 | | " | brown |
| 88 | | " | brown |
| 89 | | | brown |
| 90 | | " | brown |
| 91 | | " | brown |
| 92 | | " | olive brown |
| 93 | | | olive brown |
| 94 | | " | olive brown |

-continued

| No. | Dye of the formula (2) | Dye of the formula (3) | Shade |
|---|---|---|---|
| 95 | [structure: naphthalene with OH, NO2, N=N, naphthol OH] | " | olive brown |
| 96 | [structure: benzene with OCH3, OCH3, N=N, naphthol OH] | " | brown |
| 97 | [structure: phenol with OH, NO2, N=N, naphthol OH, C5H11] | " | brown |
| 98 | [structure: naphthol with OH, HO3S, N=N-C=C(OH)-N(cyclohexyl), C=N, CH3] | " | brownish red |
| 99 | [structure: naphthol with OH, HO3S, N=N, naphthol OH] | " | brown |
| 100 | [structure: naphthol with OH, HO3S, N=N, naphthol OH] | " | " |
| 101 | [structure: HO3S, OH, Cl, N=N, naphthol OH, HN-COCH3] | " | " |
| 102 | [structure: HO3S, OH, NO2, N=N, naphthol OH, HN-COCH3] | " | " |
| 103 | [structure: HO3S, OH, NO2, N=N, phenol OH, C5H11] | " | " |
| 104 | [structure: HO3S, OH, NO2, N=N, naphthol OH] | " | " |

| No. | Dye of the formula (2) | Dye of the formula (3) | Shade |
|---|---|---|---|
| 105 | (2-hydroxy-4-nitrophenyl)azo pyrazolone with cyclohexyl-N, OH, CH3 | " | orange brown |
| 106 | 2,4-dinitro-6-[(2-hydroxynaphthyl)azo]phenol | " | brown |
| 107 | 2-hydroxy-5-pentyl-phenylazo-(2-hydroxy-5-nitrophenyl) | 2-hydroxy-5-nitro-4-(methylsulfonyl)phenyl-N=CH-(2-hydroxyphenyl)-azo-cyclohexyl-azo-(3-sulfocyclohexyl) | " |
| 108 | (2-hydroxy-5-nitrophenyl)azo-2-hydroxynaphthyl | " | " |
| 109 | (2-hydroxy-4-nitrophenyl)azo-2-hydroxynaphthyl | " | " |
| 110 | (2,4-dimethoxyphenyl)azo-2-hydroxynaphthyl | " | " |
| 111 | (2-hydroxy-3-sulfo-5-nitrophenyl)azo-2-hydroxynaphthyl | " | " |
| 112 | (2-hydroxy-3-sulfo-5-nitrophenyl)azo-(2-hydroxy-5-butylphenyl) | " | " |
| 113 | (2-hydroxy-5-nitrophenyl)azo-C(COHCH3)=C(CONH-cyclohexyl) | " | yellowish brown |
| 114 | (2-hydroxy-5-sulfophenyl)azo-2-hydroxynaphthyl | " | brown |

-continued

| No. | Dye of the formula (2) | Dye of the formula (3) | Shade |
|---|---|---|---|
| 115 | (structure with OH, HO₃S, NO₂, N=C-CH₃, C(OH), CO-NH-cyclohexyl) | " | yellowish brown |
| 116 | (structure: OH, Cl-phenyl-N=N-naphthol-SO₃H) | " | brown |
| 117 | (structure: OH, Cl-phenyl-N=N-naphthol-SO₃H) | " | " |
| 118 | (structure: OH, NO₂, N=N, OH, C₅H₁₁) | (structure: OH, SO₂CH₃, N=CH, OH, N=N, N=N, SO₃H) | reddish brown |
| 119 | (structure: OH, NO₂, N=N, naphthol-OH) | " | brown |
| 120 | (structure: OH, NO₂, N=N, naphthol-OH) | " | " |
| 121 | (structure: OCH₃, OCH₃, N=N, naphthol-OH) | " | " |
| 122 | (structure: OH, Cl, N=N, naphthol-OH) | " | " |
| 123 | (structure: OH, Cl, N=N, naphthol-OH, SO₃H) | " | " |
| 124 | (structure: OH, HO₃S, N=N, OH naphthol) | " | " |

-continued

| No. | Dye of the formula (2) | Dye of the formula (3) | Shade |
|---|---|---|---|
| 125 | HO₃S, OH, Cl substituted phenyl–N=N–naphthyl-OH | " | " |
| 126 | HO₃S, OH, NO₂ substituted phenyl–N=N–naphthyl-OH | " | " |
| 127 | OH, SO₃H substituted phenyl–N=N–naphthyl-OH | " | " |
| 128 | OH, HO₃S substituted naphthyl–N=N–naphthyl-OH | OH–N=CH–(OH-cyclohexyl)–N=N–cyclohexyl–N=N–phenyl-SO₃H, with N-cyclohexyl-hydrazo substituent | " |
| 129 | HO₃S, OH, NO₂ substituted phenyl–N=N–naphthyl-OH | " | " |
| 130 | HO₃S, OH, NO₂ substituted phenyl–N=N–naphthyl-OH | OH–N=CH–(OH-cyclohexyl, NO₂)–N=N–naphthyl–N=N–phenyl-SO₃H | " |
| 131 | OH, NO₂ substituted phenyl–N=N–naphthyl-OH | " | " |
| 132 | OH, Cl substituted phenyl–N=N–naphthyl-OH | " | " |
| 133 | OH, NO₂ substituted phenyl–N=N–naphthyl-OH | OH–N=CH–(OH-cyclohexyl, NO₂)–N=N–cyclohexyl–N=N–naphthyl-SO₃H | " |

| No. | Dye of the formula (2) | Dye of the formula (3) | Shade |
|---|---|---|---|
| 134 | (structure: 2-hydroxy-5-nitro-cyclohexyl-N=N-2-hydroxy-5-C₅H₁₁-cyclohexyl) | " | " |
| 135 | (structure: 3-HO₃S-2-hydroxy-5-nitro-cyclohexyl-N=N-2-hydroxy-5-C₄H₉-cyclohexyl) | " | " |
| 136 | (structure: 2-hydroxy-5-nitro-cyclohexyl-N=N-2-hydroxy-4,5-dimethyl-cyclohexyl) | " | " |
| 137 | (structure: 2-hydroxy-5-nitro-cyclohexyl-N=N-1-hydroxy-decahydronaphthyl) | (structure: 2-hydroxy-5-C₄H₉-cyclohexyl-N=CH-1-hydroxy-cyclohexyl-N=N-cyclohexyl-N=N-SO₃H-cyclohexyl) | " |
| 138 | (structure: 2-hydroxy-4-nitro-cyclohexyl-N=N-2-hydroxy-decahydronaphthyl) | " | " |
| 139 | (structure: 2,5-dimethoxy-cyclohexyl-N=N-1-hydroxy-decahydronaphthyl) | " | " |
| 140 | (structure: 2-hydroxy-5-nitro-cyclohexyl-N=N-pyrazolone with cyclohexyl and CH₃) | " | brownish orange |
| 141 | (structure: 3-HO₃S-2-hydroxy-5-nitro-cyclohexyl-N=N-1-hydroxy-decahydronaphthyl) | " | brown |
| 142 | (structure: 3-HO₃S-2-hydroxy-5-nitro-cyclohexyl-N=N-2-hydroxy-5-C₅H₁₁-cyclohexyl) | " | " |
| 143 | (structure: 1-hydroxy-4-HO₃S-decahydronaphthyl-N=N-2-hydroxy-decahydronaphthyl) | " | " |

-continued

| No. | Dye of the formula (2) | Dye of the formula (3) | Shade |
|---|---|---|---|
| 144 | [structure: naphthalene with OH, HO₃S, NO₂ substituents, N=N linked to naphthalene with OH] | " | " |
| 145 | [structure: phenyl with OH, Cl, N=N linked to naphthalene with OH] | " | " |
| 146 | [structure: phenyl with OH, NO₂, N=N linked to phenyl with OH, C₅H₁₁] | " | " |
| 147 | [structure: phenyl with OH, NO₂, N=N linked to naphthalene with OH] | [structure: cyclohexane with COCH, N=CH linked to phenyl with OH, N=N—phenyl—N=N—phenyl with SO₃H] | " |
| 148 | [structure: phenyl with OH, NO₂, N=N linked to naphthalene with OH] | " | olive brown |
| 149 | [structure: phenyl with OH, Cl, N=N linked to naphthalene with OH] | " | brown |
| 150 | [structure: phenyl with OH, NO₂, N=N linked to phenyl with OH, C₅H₁₁] | " | " |
| 151 | [structure: phenyl with OCH₃, OCH₃, N=N linked to naphthalene with OH] | " | olive brown |
| 152 | [structure: naphthalene with OH, HO₃S, N=N linked to naphthalene with OH] | " | brown |
| 153 | [structure: naphthalene with OH, SO₃H, NO₂, N=N linked to naphthalene with OH] | " | " |

| No. | Dye of the formula (2) | Dye of the formula (3) | Shade |
|---|---|---|---|
| 154 | (structure) | " | " |
| 155 | (structure) | " | " |
| 156 | (structure) | " | orange |
| 157 | (structure) | " | brownish red |
| 158 | (structure) | " | brownish yellow |
| 159 | (structure) | " | brownish yellow |
| 160 | (structure) | (structure) | brown |
| 161 | (structure) | " | " |
| 162 | (structure) | " | " |

| No. | Dye of the formula (2) | Dye of the formula (3) | Shade |
|---|---|---|---|
| 163 | (structure: H₃S, OH, N=N, OH, NO₂, C₅H₁₁) | | ″ |
| 164 | (structure: OH, N=N, OH, NO₂, naphthalene) | | ″ |
| 165 | (structure: OH, N=N, OH, NO₂, naphthalene) | (structure: OH, N=CH, OH, SO₂CH₃, N=N, N=N, SO₃H) | ″ |
| 166 | (structure: OH, N=N, OH, NO₂, naphthalene) | | ″ |
| 167 | (structure: OH, N=N, OH, NO₂, C₅H₁₁) | | ″ |
| 168 | (structure: OH, N=N, OH, NO₂, naphthalene) | (structure: OH, N=CH, OH, O₂N, SO₂CH₃, N=N, N=N, SO₃H) | ″ |
| 169 | (structure: OH, N=N, OH, NO₂, C₅H₁₁) | | ″ |
| 170 | (structure: HO₃S, OH, N=N, OH, NO₂, C₅H₁₁) | (structure: OH, N=CH, OH, N=N, N=N, SO₃H) | ″ |
| 171 | (structure: HO₃S, OH, N=N, OH, NO₂, naphthalene) | | ″ |

-continued
| No. | Dye of the formula (2) | Dye of the formula (3) | Shade |
|---|---|---|---|
| 172 | 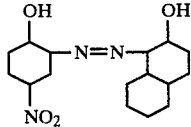 | | " |
| 173 | 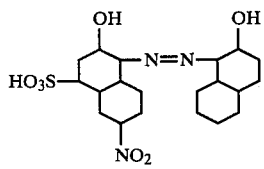 | 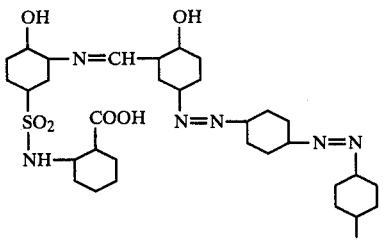 | " |
| 174 | 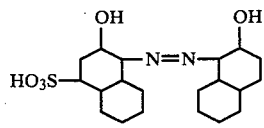 | " | " |
| 175 | 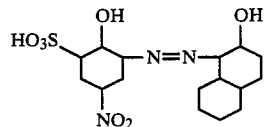 | 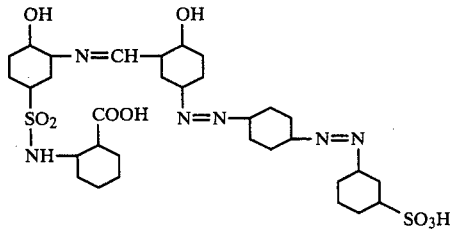 | " |
| 176 | 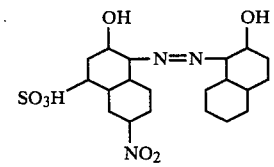 | 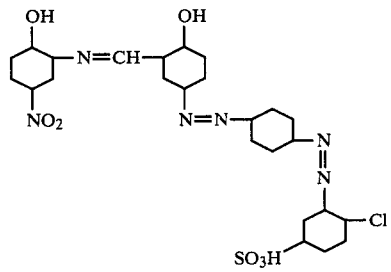 | " |
| 177 | 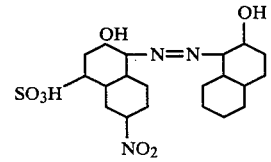 | 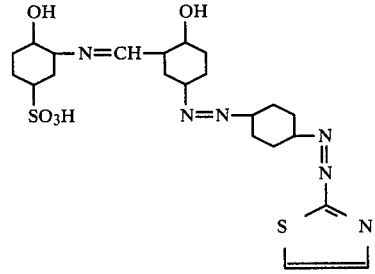 | " |
| 178 | 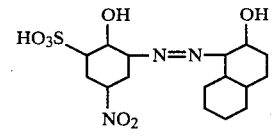 | " | " |
| 179 | 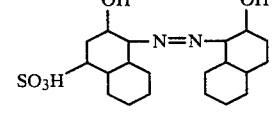 | " | " |

-continued

| No. | Dye of the formula (2) | Dye of the formula (3) | Shade |
|---|---|---|---|
| 180 | (structure) | (structure) | " |
| 181 | (structure) | | " |
| 182 | (structure) | | " |
| 183 | (structure) | (structure) | " |
| 184 | (structure) | | " |
| 185 | (structure) | (structure) | " |
| 186 | " | (structure) | " |
| 187 | (structure) | " | " |

| No. | Dye of the formula (2) | Dye of the formula (3) | Shade |
|---|---|---|---|
| 188 | HO₃S, OH, N=N, OH, NO₂ (structure) | " | " |
| 189 | HO₃S, OH, N=N, OH, NO₂ (structure) | OH, N=CH, OH, NO₂, N=N, N=N (structure) | " |

Dyeing Procedure for Wool 100 parts of wool hand-knitting yarn are put at 50° C. into a dyebath which contains 2 parts of the dye of Example 3, 4 parts of ammonium sulphate and 2 parts of a levelling agent in 4000 parts of water. The liquor is brought to the boil over the course of 45 minutes and kept thereat for a further 45 minutes. The goods are then removed from the bath, thoroughly rinsed with cold water and dried.

Dyeing Procedure for Leather 100 parts of clothing velours leather (dry weight) are wet back at 50° C. for 2 hours in a solution of 1000 parts of water and 2 parts of 24% ammonia and subsequently dyed for 1 hour at 60° C. in a solution of 1000 parts of water, 2 parts of 24% ammonia and 6 parts of the dye of Example 1. A solution of 40 parts of water and 4 parts of formic acid (85%) is then added and dyeing is continued for a further 30 minutes. The leather is then thoroughly rinsed and, if appropriate, treated for 30 minutes at 50° C. with 2 parts of a dicyandiamine/formaldehyde condensation product. Other kinds of velour leather as well as glove leather can be dyed in the same manner.

We claim:

1. A 1:2 chromium complex dye of the formula

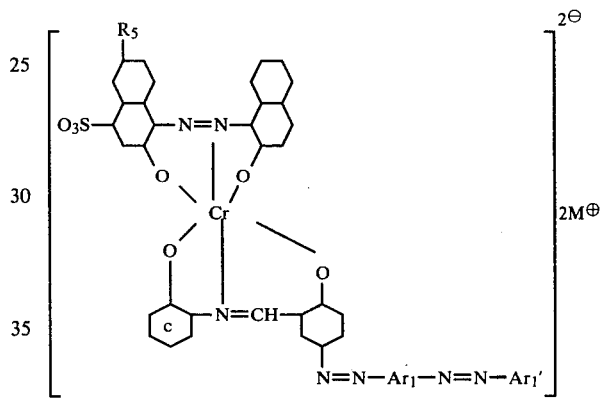

wherein
$R_5$ is hydrogen or nitro,
the benzene ring c is substituted by sulfo, methylsulfonyl or nitro; or by nitro and methylsulfonyl or sulfo,
$Ar_1$ is phenylene which is unsubstituted or substituted by lower alkyl or lower alkoxy or is naphthylene which is unsubstituted or substituted by sulfo,
$Ar_1'$ is phenyl or naphthyl which are unsubstituted or substituted by chloro, bromo, nitro, sulfo, sulfonamido, lower alkyl or lower alkoxy, and
M is a cation.

2. A chromium complex dye according to claim 1, of the formula

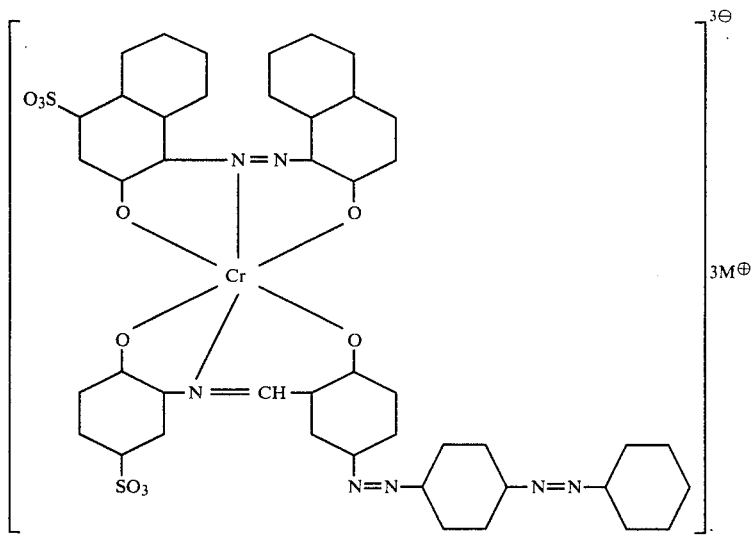
3. A chromium complex dye according to claim 1, of the formula
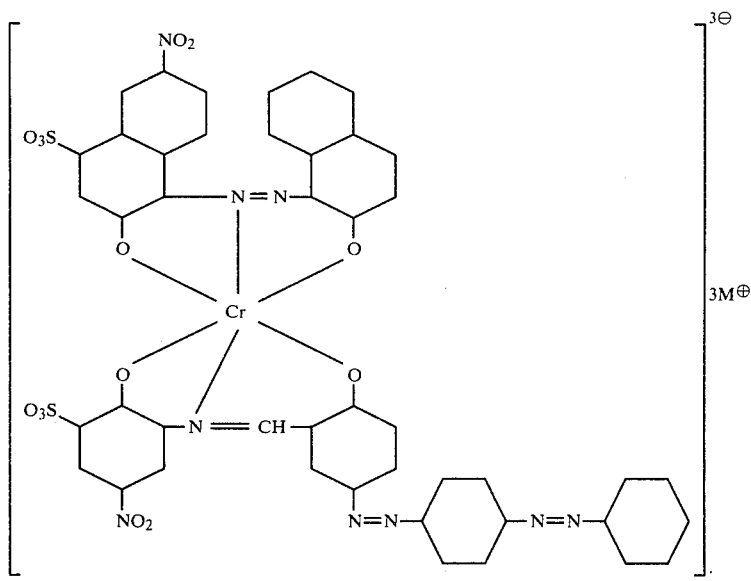
4. A chromium complex dye according to claim 1, of the formula

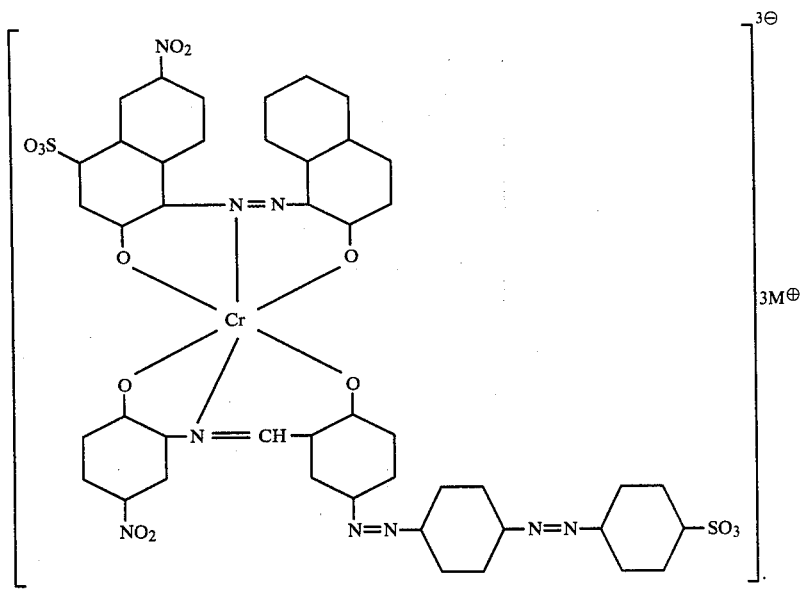
5. A chromium complex dye according to claim 1, of the formula
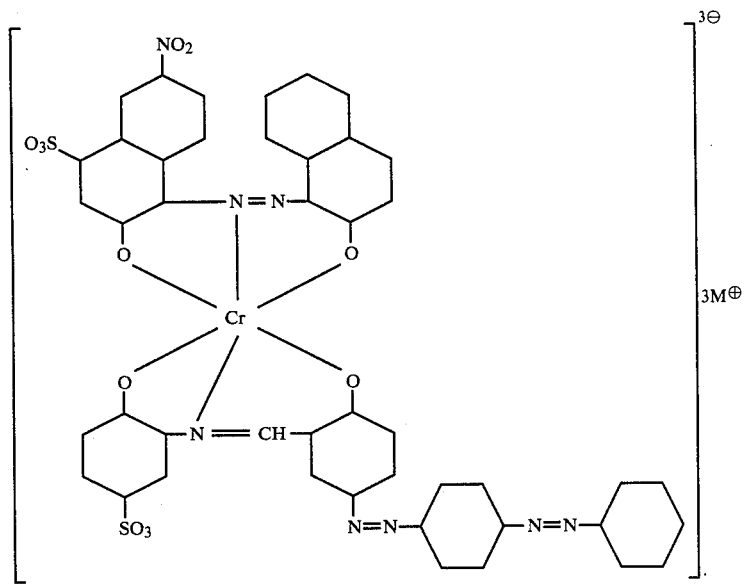
6. A chromium complex dye of the formula
7. A chromium complex dye of the formula
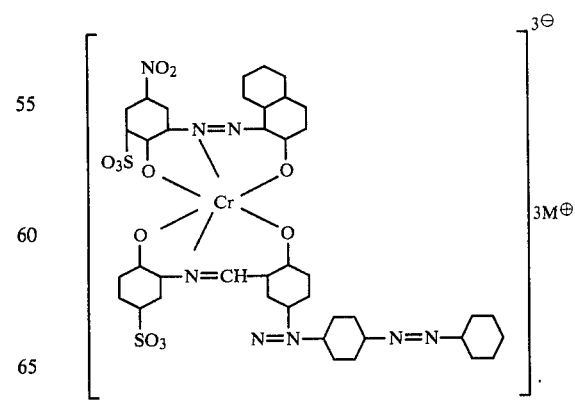

8. A chromium complex dye of the formula
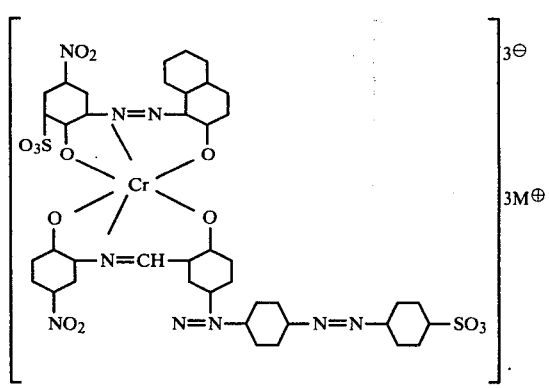
10. A 1:2 chromium complex dye of the formula
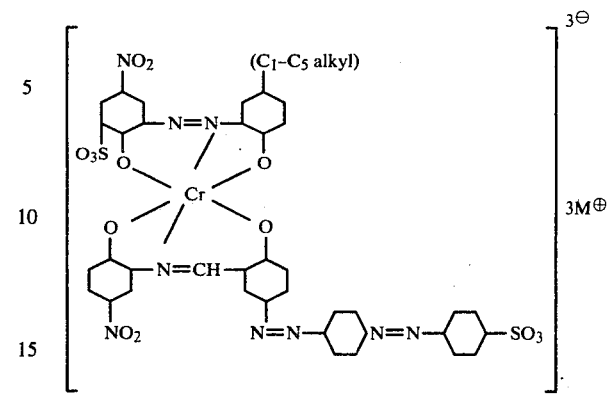
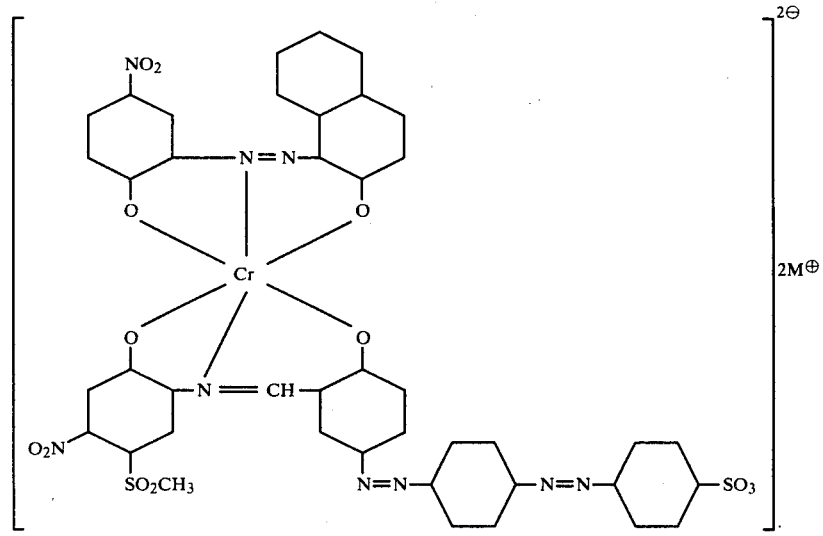
9. A 1:2 chromium complex dye of the formula
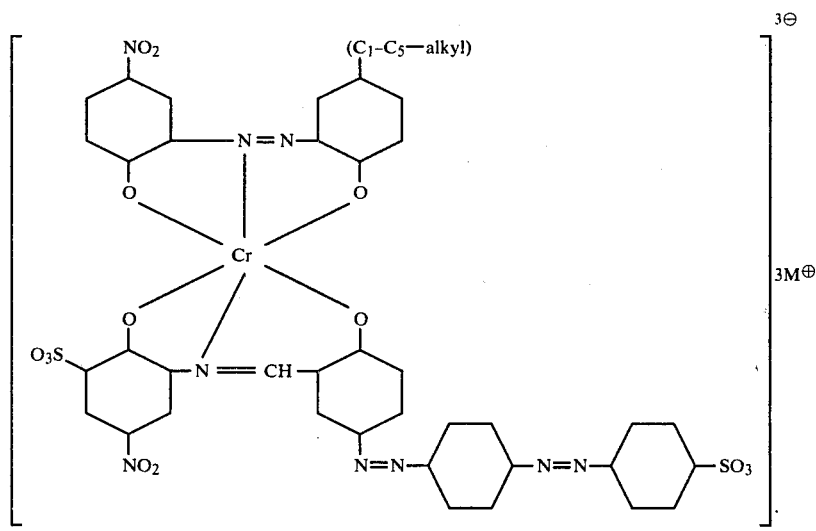
* * * * *